(No Model.)

F. N. ETHRIDGE.
HEEL TRIMMING MACHINE.

No. 411,121. Patented Sept. 17, 1889.

WITNESSES.
Chas. Spaulding
Charles E. Moss

INVENTOR.
F. N. Ethridge
by Wright Brown Quinby
Attys (No Model.) 8 Sheets—Sheet 2.

F. N. ETHRIDGE.
HEEL TRIMMING MACHINE.

No. 411,121. Patented Sept. 17, 1889.

WITNESSES
Chas. Spaulding
Charles E. Moss.

INVENTOR,
F. N. Ethridge (No Model.) 8 Sheets—Sheet 3.

F. N. ETHRIDGE.
HEEL TRIMMING MACHINE.

No. 411,121. Patented Sept. 17, 1889.

WITNESSES
Chas. Spaulding
Charles E. Moss

INVENTOR
F. N. Ethridge (No Model.) 8 Sheets—Sheet 4.

F. N. ETHRIDGE.
HEEL TRIMMING MACHINE.

No. 411,121. Patented Sept. 17, 1889.

WITNESSES.
Chas. Spaulding
Charles E. Moss.

INVENTOR.
F. N. Ethridge (No Model.)  8 Sheets—Sheet 5.

F. N. ETHRIDGE.
HEEL TRIMMING MACHINE.

No. 411,121.  Patented Sept. 17, 1889.

WITNESSES
Chas. Spaulding
Charles E. Moss

INVENTOR
F. N. Ethridge
by Wright Brown Quimby
Attys

N. PETERS, Photo-Lithographer, Washington, D. C.

(No Model.) 8 Sheets—Sheet 6.

F. N. ETHRIDGE.
HEEL TRIMMING MACHINE.

No. 411,121. Patented Sept. 17, 1889.

WITNESSES.
Chas. Spaulding
Charles E. Moss.

INVENTOR
F. N. Ethridge (No Model.) 8 Sheets—Sheet 7.
F. N. ETHRIDGE.
HEEL TRIMMING MACHINE.
No. 411,121. Patented Sept. 17, 1889.

(No Model.) 8 Sheets—Sheet 8.

F. N. ETHRIDGE.
HEEL TRIMMING MACHINE.

No. 411,121. Patented Sept. 17, 1889.

WITNESSES.
Chas. Spaulding
Charles E. Moss.

INVENTOR.
F. N. Ethridge

UNITED STATES PATENT OFFICE.

FRANK N. ETHRIDGE, OF LYNN, ASSIGNOR, BY MESNE ASSIGNMENTS, TO ISAAC P. T. EDMANDS, TRUSTEE, OF BOSTON, MASSACHUSETTS.

HEEL-TRIMMING MACHINE.

SPECIFICATION forming part of Letters Patent No. 411,121, dated September 17, 1889.

Application filed September 24, 1888. Serial No. 286,250. (No model.)

*To all whom it may concern:*

Be it known that I, FRANK N. ETHRIDGE, of Lynn, in the county of Essex and State of Massachusetts, have invented certain new and useful Improvements in Heel-Trimming Machines, of which the following is a specification.

This invention consists in the several improvements in heel-trimming machines hereinafter described and claimed, reference being had to the accompanying drawings and the letters and figures of reference marked thereon, in which—

Fig. 1ª represents a section on line $x'$ $x'$, Fig. 3. Figs. 2 and 3 represent side elevations taken from opposite sides of the machine. Fig. 4 represents a bottom view of the heel-rest and its supporting-arm. Fig. 5 represents a section on line $x$ $x$, Fig. 4. Figs. 6 and 7 represent sectional views of one of the friction-wheels, Fig. 6 being a section on line $y$ $y$ of Fig. 7, while Fig. 7 is a section on line $z$ $z$ of Fig. 6.

The same letters of reference indicate the same parts in all the figures.

In the drawings, $a$ represents a shaft which is journaled in bearings on a supporting-standard $b$, and has the heel-trimming cutter-head attached to it, said shaft being driven by power applied in any suitable way.

Figure 8:
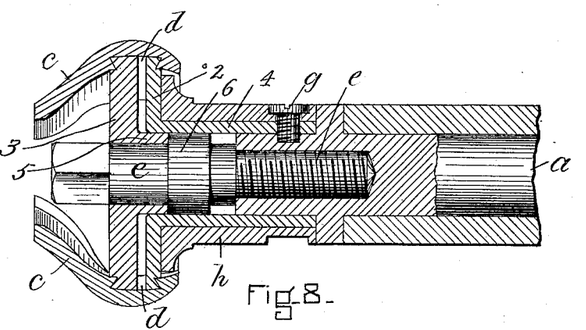
Fig. 8 represents a longitudinal section of the heel-trimming cutter-head.
Figures 9, 10, 11, 12:
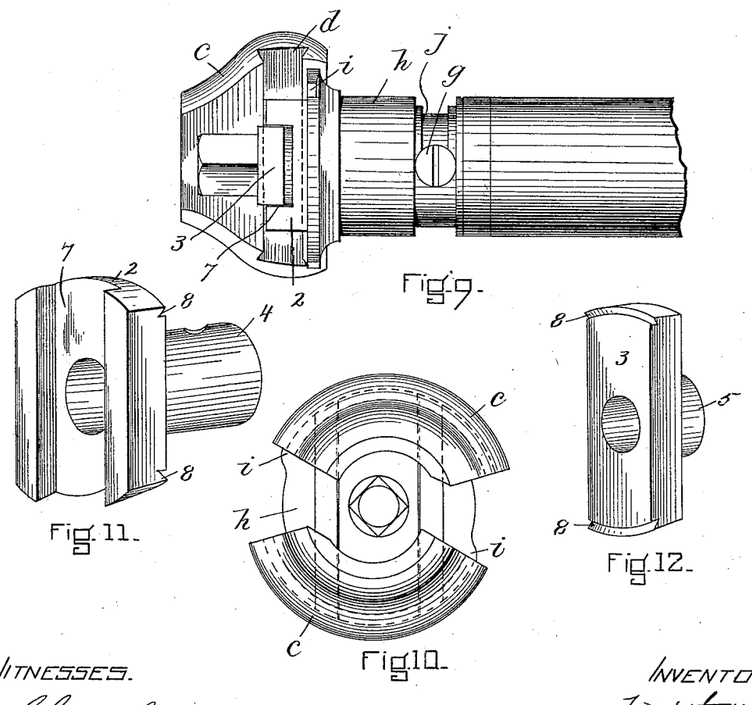
Figs. 9 and 10 represent, respectively, a side elevation and an end elevation of the same.
Figs. 11 and 12 represent perspective views of the parts of the sectional blade-holder detached.

$c$ $c$ represent the knives or cutters of the heel-trimming cutter-head, which knives are molded to impart the desired form to a heel, and are provided in their inner surfaces with seats for the expansible holder, hereinafter described, said seats being preferably dovetail grooves $d$, extending lengthwise of the knives or cutters and in a plane at right angles to their axis of rotation. The expansible holder for said cutters is here shown as composed of two parts—viz., a section 2, formed on a sleeve 4, which incloses the shaft $a$, and a section 3, which has a central hub 5, formed to enter the sleeve 4 of the section 2, the inner section 2 having a longitudinal recess 7 in its outer side, formed to receive a part of the outer section 3, and prevent the latter from turning independently. The outer sides of the sections 2 3 have dovetail ribs 8 8, formed to fit the dovetail sides of the grooves $d$ of the cutters, said ribs being curved and slightly eccentric to the axis of the shaft $a$, to give the cutters engaged therewith the necessary clearance or decrease in height from cutting-edge to heel.

The sleeve 4 and the section 2, formed thereon, are rigidly affixed to the shaft $a$ by a screw $g$ or other suitable attaching device; but the outer section 3 is adjustable toward and from the inner section to give the holder which the two sections constitute the required expansibility and contractibility, said holder being expanded in a direction at right angles with the grooves in the cutters and caused to grasp and hold the cutters by a movement of the section 3 away from the section 2, and contracted and caused to release the cutters by a movement of the section 3 toward the section 2. The minimum conjoint width of the sections 2 3 is appreciably less than the width of the dovetail grooves $d$ in the cutters.

The section 3 is adjusted, as above described, by a bolt $e$, the inner end of which is screw-threaded and engaged with a threaded socket in the shaft $a$, so that a rotary movement of the bolt will give it an endwise movement in or out, as the case may be. The bolt has a shoulder or enlargement 6 within the sleeve 4, which shoulder bears against the inner end of the hub 5 of the section 3, so that when the bolt is moved outwardly its shoulder forces the section 3 outwardly, and thus expands the cutter-holder. When the bolt $e$ is moved inwardly, it permits the section 3 to be moved toward the section 2 to contract the cutter-holder. The bolt has a squared outer end or head adapted to be engaged by a suitable wrench or tool, whereby the bolt is rotated.

It will be seen that the expansible holder located entirely within the cutters securely fastens the cutters to the shaft without obstructing their ends or any of their external surfaces.

In another application for patent for heel-trimming machines, filed June 8, 1888, Serial No. 276,483, I have shown an expansible holder of somewhat different construction; but this application comprises an expansible two-part holder having one section rigid and the other adapted to be moved or adjusted outward crosswise of the grooves in the cutters, as hereinafter fully set forth.

$h$ represents a sleeve inclosing the sleeve 4 of the section 2 and secured to the shaft by the screw $g$. Said sleeve has lugs $i$ $i$, formed on its outer end, arranged to support the heels or rear ends of the cutters $c$ $c$, as in my former application, the sleeve having a slot $j$, which, as in said application, permits the adjustment of said lugs to compensate for wear of the cutters.

Figure 1:
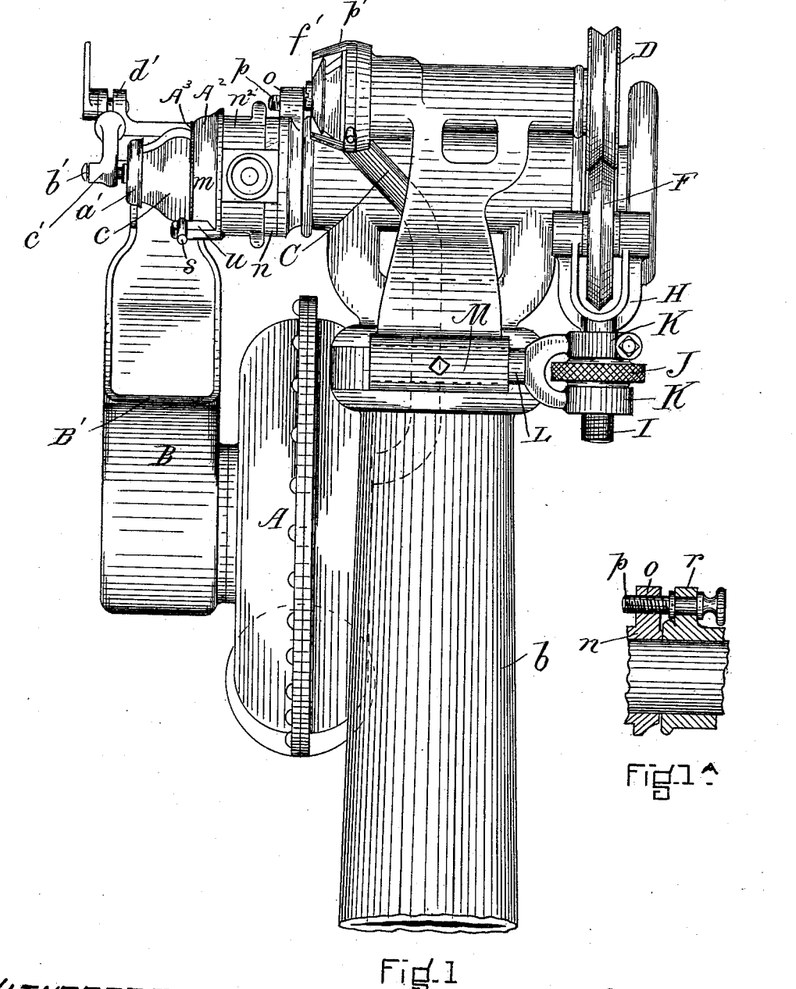
Figure 1 represents a front elevation of my improved heel-trimming machine.
Figures 2, 6, 7:
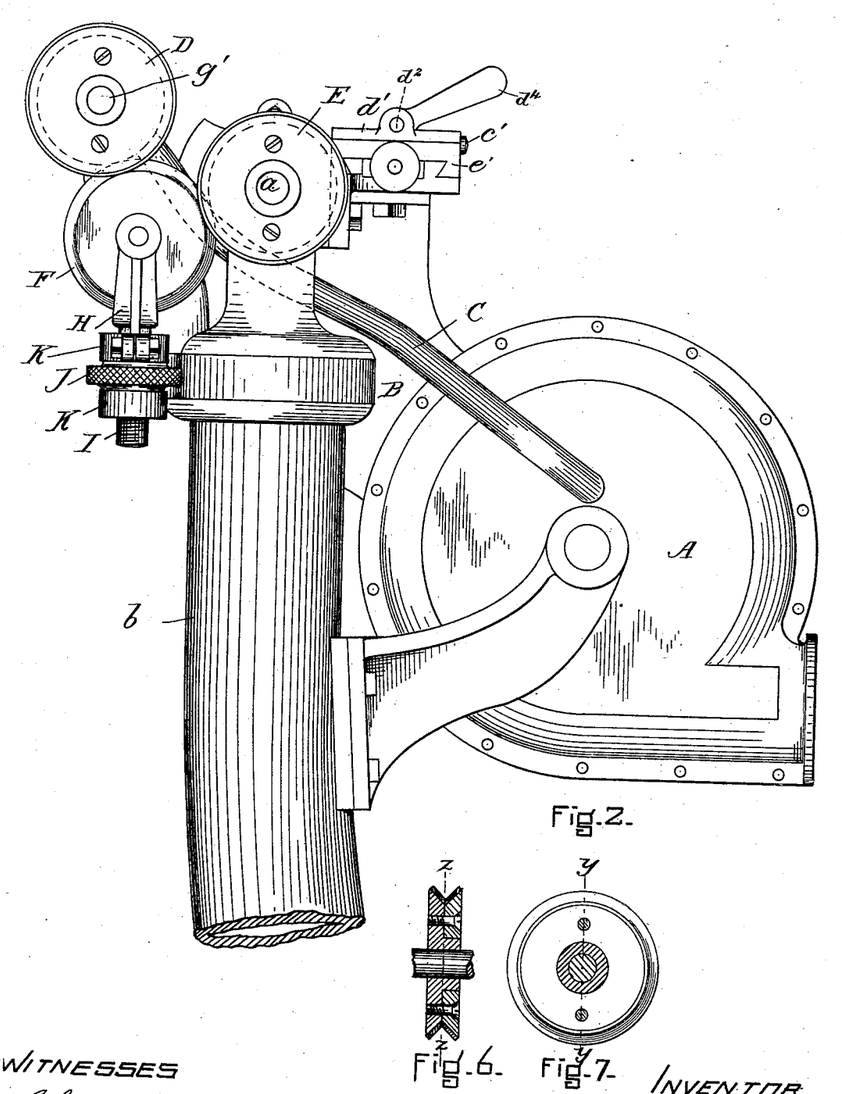

The top-lift rest $m$ has the longer wall or face $A^2$ for the tread-surface of the top lift of a heel presented to the cutter, and the shorter wall or face $A^3$ for the edge of the top lift, as in my other application above referred to. Said rest is attached to a yoke $n^2$, which is fitted to slide on a collar or sleeve $n$, which in turn is fitted to slide longitudinally on one of the bearings of the shaft $a$, and has a lug $o$, which is tapped to receive a screw $p$. Said screw is mounted to rotate without moving endwise in a fixed lug $r$ on one of the bearings of the shaft $a$, all as shown in Fig. 1$^a$. The rotation of the said screw $p$ causes it to move the sleeve $n$ and top-lift rest, and thus cause the latter to project more or less over the top-lift end of the cutter-head. The yoke $n^2$ is adjustable at right angles with the axis of the cutter, so as to enable the shorter wall $A^3$ to be adjusted to different-sized cutter-heads, as in my former application.

Figures 3, 4, 5:
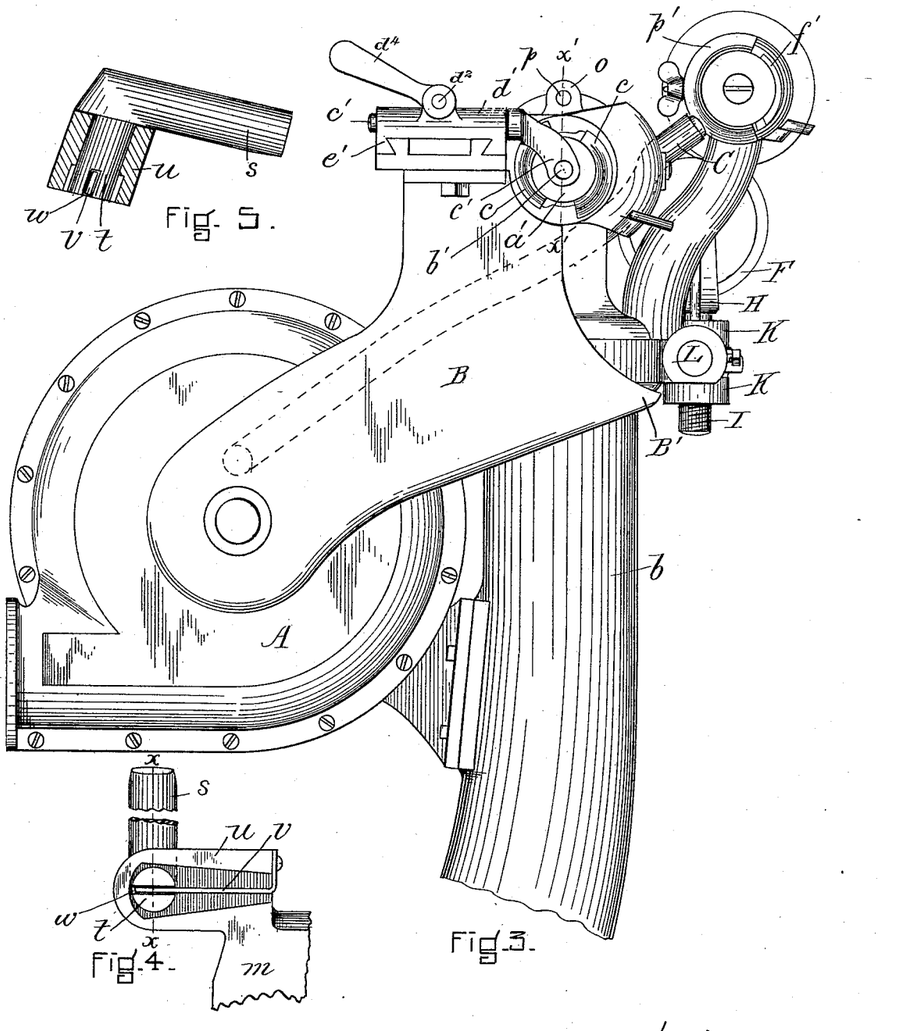

The rest $s$ for the side of the heel has a stud $t$ formed on its inner end, which stud is journaled in a socket or bearing formed in an arm $u$, affixed to the top-lift rest $m$, the heel-rest $s$ being thus adapted to swing laterally, so that it may be displaced by contact of the shank of a boot or shoe sole with it when the shoe is turned to present the extreme forward end of the heel to the cutter-head, as shown in my former application above referred to. To keep the rest $s$ normally in its operative position, I secure a spring $v$ to the arm $u$, in which the stud $t$ is journaled, and engage the free end of said spring with a slot $w$ in the stud, as shown in Figs. 4 and 5. The spring $v$ normally holds the rest $s$ in its operative position—viz., at right angles with the axis of the cutter—and yields to permit the rest to be swung away from said position when the shank of the boot or shoe sole comes in contact with said rest.

Figures 16, 18:
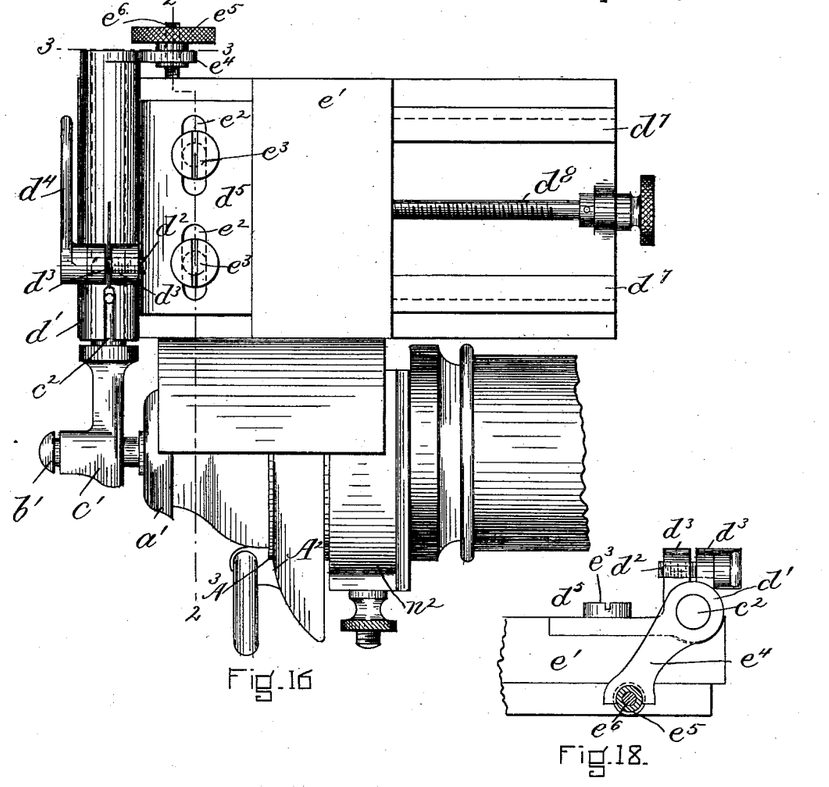
Fig. 16 represents a top view of a portion of the machine.
Fig. 18 represents a section on line 3 3, Fig. 16.
Figure 17:
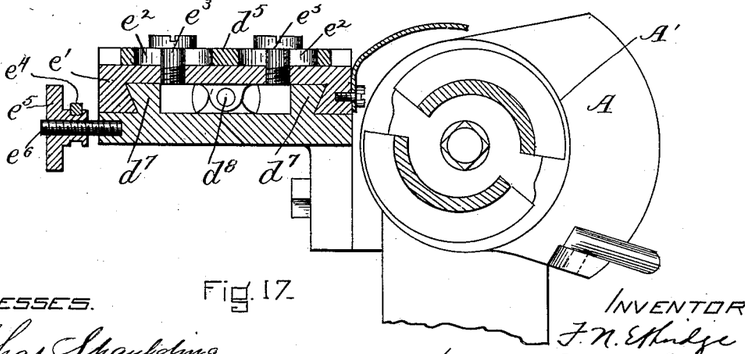
Fig. 17 represents a section on line 2 2, Fig. 16.

$a'$ represents the counter-guard, which is a saucer-shaped disk attached to a stud $b'$. Said stud is mounted in a bearing in an arm $c'$, which has a shank $c^2$ inserted in a split sleeve or socket $d'$. The split sleeve $d'$ is compressed to hold the shank $c^2$ firmly at any point to which it may be adjusted by a screw $d^2$, working in tapped ears $d^3 d^3$ on said sleeve and provided with a lever or handle $d^4$. The sleeve $d'$ is formed on a plate $d^5$, which is adapted to slide at right angles to the axis of the cutter-head on a slide $e'$, which is movable on a plane parallel with the axis of the cutter on fixed guides $d^7 d^7$, and may be adjusted in said direction by a screw $d^8$, so as to move the arm $c'$ and the counter-guard carried thereby toward or from the top-lift rest. The plate $d^5$ has slots $e^2 e^2$, which receive screws $e^3 e^3$, inserted in the plate $e'$, said slots and screws permitting the plate $d^5$ to slide toward and from the cutter-head. The sleeve $d'$ has at its rear end an arm $e^4$, Figs. 16 and 18, which engages with a grooved nut $e^5$ on a screw-stud $e^6$, affixed to the slide $e'$. The rotation of the nut $e^5$ causes the sleeve $d'$ to move forward or backward, as the case may be, thus rendering it possible to adjust the counter-guard forward or backward while the machine is in operation.

Figure 13:
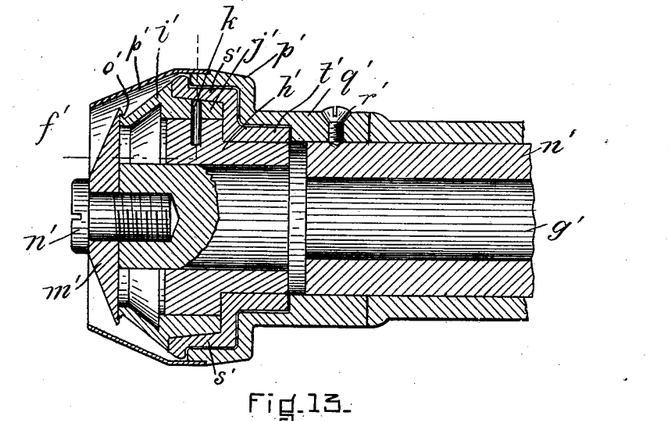
Fig. 13 represents a longitudinal section of the rand-trimmer.
Figure 14:
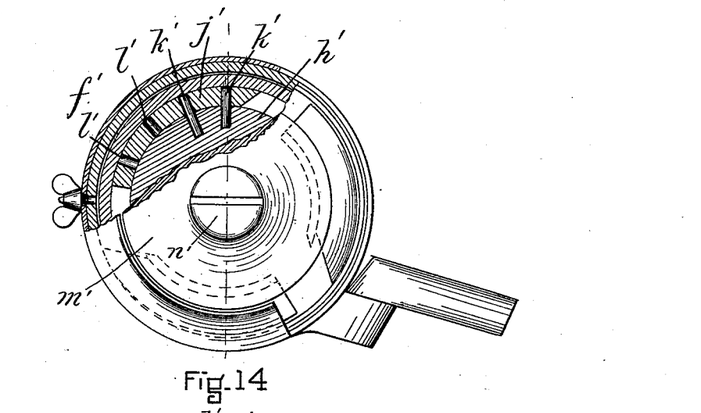
Fig. 14 represents a partial end view and partial section of the rand-trimmer.
Figure 15:
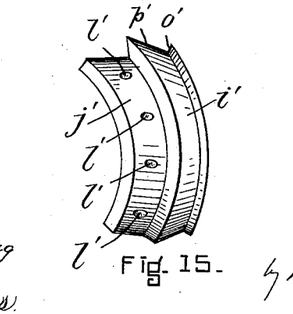
Fig. 15 represents a perspective view of one of the blades of the rand-trimmer.

At $f'$ is shown the rand and heel-seat trimmer, which is mounted on a shaft $g'$, journaled in bearings on the supporting-frame and driven by friction-pulleys from the shaft $a$, as hereinafter described. Said rand-trimmer is composed of a head $h'$, attached to the shaft $g'$ and having a cylindrical periphery, two or more blades $i'$, having segmental flanges $j'$ formed to fit the periphery of the head $h'$, and a circular guard $m'$, attached by a screw $n'$ to the shaft $g'$ and having a marginal lip which projects slightly over the rand-cutting portions of the knives, each knife having two oppositely-beveled surfaces $p'$ $o'$, which at the sharpened end form, respectively, the heel-seat-trimming edge and the rand-trimming edge. The knives $i'$ are attached to the head $h'$ by means of pins $k'$, which project from the periphery of the head and enter orifices $l'$ in the flanges of the knives. The orifices in the knife-flanges exceed the number of the pins, so that as the knife becomes worn it can be moved forward by removing it from the pins and re-engaging it by placing orifices on the pins which before were behind the pins. The knives are held in engagement with the pins $k'$ by a flange $s'$, formed on a collar $t'$, which is fitted on the head $h'$, said flange projecting over the flanges of the knives, as shown in Fig. 13. The head $h'$ has a shoulder which bears against the collar $t'$, said head, collar, and knives being secured to the shaft $g'$ by the guard-disk $m'$ and its attaching-screw $n'$.

Figure 19:
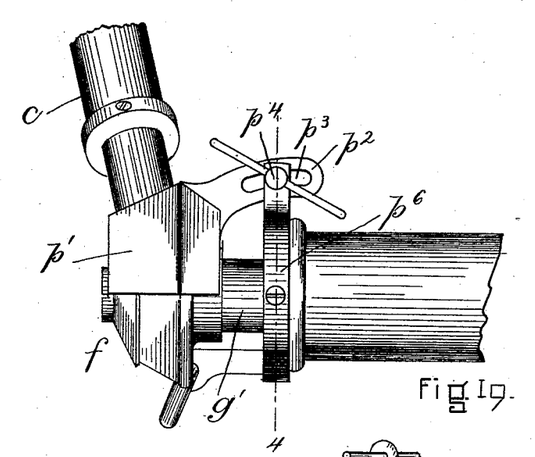
Fig. 19 represents an enlarged top view of the rand-trimmer and the means for connecting the hood of the dust and chip-conducting tube to the supporting-frame.
Figures 20, 21:
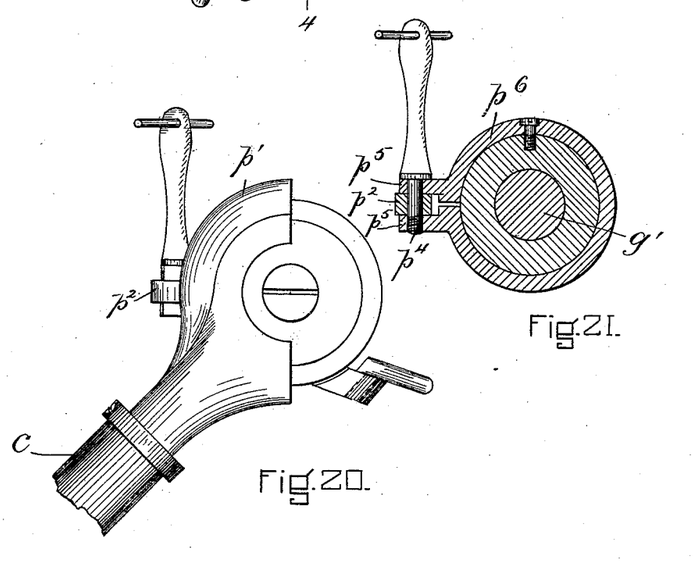
Fig. 20 represents an end view of the parts shown in Fig. 19.
Fig. 21 represents a section on line 4 4, Fig. 19.

$p'$ represents a hood or shield, which is formed to inclose the rand-cutter, excepting at its front side. The hood $p'$ is provided with an arm $p^2$, Fig. 19, having a slot $p^3$. Said arm is clamped by a screw $p^4$ between ears $p^5$ on a collar $p^6$, affixed to a fixed bearing in which the shaft $g'$ rotates, said screw passing through the slot $p^3$. By loosening the screw $p^4$ the hood $p'$ may be displaced or swung back away from the rand-cutter to permit the free removal and application of the latter from and to its shaft $g'$.

A represents an exhaust-fan blower attached to the supporting-frame. To the casing of said blower is connected a trunk or flue B, which has a vertically-elongated mouth located behind and below the heel-trimming cutter-head, said mouth having at its lower portion a lip B', which projects forward far enough to insure the entrance into the trunk B of all the chips and cuttings that fall from the cutter.

C represents a tube which connects the casing of the blower with the hood $p'$ of the rand-trimmer, and conducts the cuttings from the rand-trimmer to the blower. Said tube is made of rubber or other flexible material to permit the described displacement of the hood $p'$.

The shaft $g'$ of the rand-trimmer has a grooved friction-pulley D. A similar pulley E is affixed to the shaft $a$ of the heel-trimmer.

F represents an intermediate friction-pulley having a V-shaped periphery formed to fit the grooved pulleys D E. Said intermediate pulley is journaled in a yoke H, on which is formed a screw-threaded shank I. Said shank is engaged with a nut J, which is supported between arms K K, formed on a horizontal stud L, which is fitted in a socket M on the supporting-frame. By rotating the nut J the yoke H and friction-wheel F are raised or lowered, as the case may be, and the said wheel is engaged with or disconnected from the wheels D E.

Figure 22:
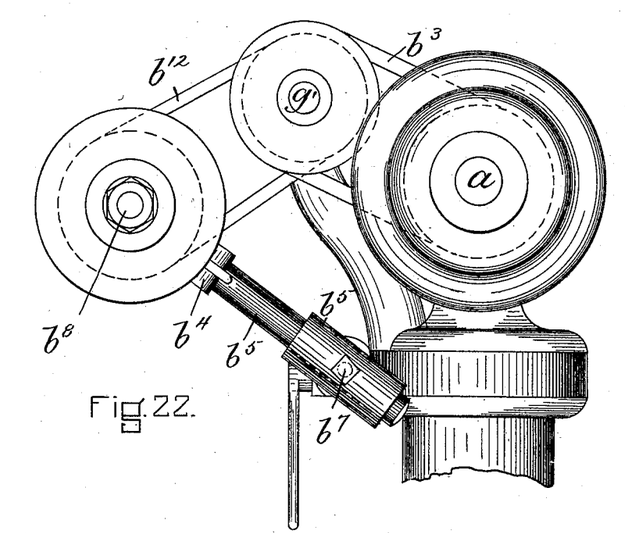
Figs. 22 and 23 represent, respectively, an end and a front view of a grinding device with which the machine is provided.
Figure 23:
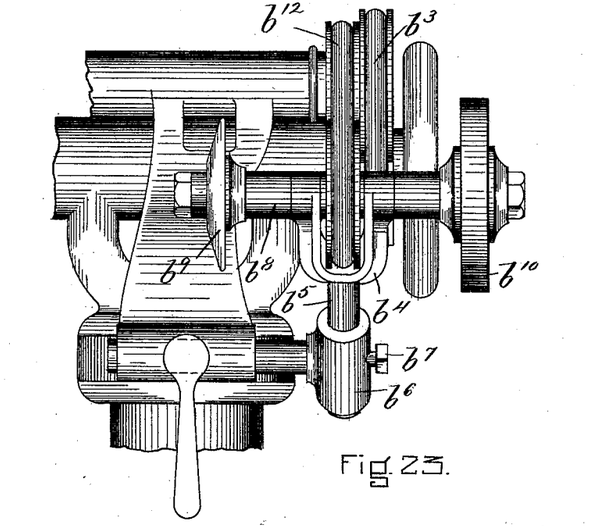

I do not limit myself, however, to the described frictional connection of the two cutter-shafts, but may, if desired, connect the shafts $a$ and $g'$ by a belt $b^3$, running on pulleys, as shown in Figs. 22 and 23.

$b^4$ represents a yoke formed on a shank or stud $b^5$, which is secured by a set-screw $b^7$ in a sleeve or socket $b^6$, affixed to the frame or pedestal of the machine. In said yoke is journaled a shaft $b^8$, which has two emery-wheels $b^9$ $b^{10}$ of suitable form to grind the knives of both cutter-heads. Said shaft is driven by a belt $b^{12}$ from the shaft $g'$ of the rand-cutter. The yoke $b^4$ may be adjusted to tighten or loosen the belt $b^{12}$ by moving its shank $b^5$ in the socket $b^6$.

I do not broadly claim in this case the two flues or trunks leading from the cutters and connecting with opposite sides of the exhaust.

I claim—

1. In a heel-trimming machine, the combination, with the cutters $c$, having grooves on their inner surfaces arranged substantially at right angles with the axis of rotation of the cutter-head, of an expansible two-part holder formed to enter said grooves and composed of a section secured to a shaft and a movable section adapted to be moved or adjusted outward crosswise of said grooves, whereby the holder is enabled to engage the sides of said grooves, substantially as set forth, the minimum conjoint width of said sections being less than that of the said grooves of the cutters, as stated.

2. In a heel-trimming machine, the combination of the shaft $a$, the holder composed of the stationary section 2, secured to said shaft, and the adjustable section fitted to said former section, said sections having curved dove-tailed ends, the screw bearing against the inner end of said adjustable section for forcing the same outward, and the cutters having in their inner surfaces dovetail grooves or seats formed to receive the ends of said sections, as set forth, the minimum conjoint width of said sections being less than that of the said grooves of the cutters, as stated.

3. In a heel-trimming machine, the combination of the shaft $a$, the holder-section 2, having the sleeve 4 attached to the shaft and provided with the recess 7, the adjustable holder-section 3, formed to enter said recess, the bolt $e$, engaged, as described, with the shaft and formed to bear against the inner end of the adjustable section, and the cutters having internal seats or grooves formed to engage the holder-sections, as set forth, the minimum conjoint width of said sections being less than that of the said grooves of the cutters, as stated.

4. In a heel-trimming machine, the combination, with a rotary cutter, of an arm or support arranged in front of the axis of the cutter, a rest pivoted at its inner end to said support and arranged to stand at right angles with the cutter as a support for the side of the heel, said rest being adapted by its pivotal connection to swing out of place and thereby avoid the shank of a boot or shoe sole, and a spring whereby said rest is normally held in a position at right angles with the axis of the cutter and permitted to yield and swing from said position, as set forth.

5. The combination, with the cutter-head, of the top-lift rest, the sleeve $n$, supporting said rest and adapted to slide on a fixed bearing, and the screw $p$, journaled in a lug on said bearing and engaged with a tapped socket in a lug on the sleeve $n$, as set forth.

6. In a heel-trimming machine, the combination, with the cutter-head and the rand-trimmer, of the exhaust-fan blower, the trunk or flue connected with the blower and having an enlarged mouth provided with a forwardlyprojecting lip and arranged adjacent the cutter-head, the hood $p'$, and the pipe C, connecting said hood with the blower-casing, substantially as set forth.

7. In a heel-trimming machine, the combination, with the exhaust-fan blower, of the hood $p'$, having the slotted arm $p^2$, the screw and clamping devices for said hood, and the flexible tube connecting said hood and blower, substantially as set forth.

8. The rand-trimmer composed of the cylindrical head $h'$, having pins $k'$, the knives having segmental flanges $j'$, formed to fit the head and provided with orifices $l'$ to receive the pins $k'$, said orifices exceeding the pins in number, the flange $s'$, secured to the head as a means of keeping the knives in engagement with the pins, and the circular guard $m'$, detachably secured to the shaft of the trimmer and serving to hold the rand-trimmer on said shaft, as set forth.

In testimony whereof I have signed my name to this specification, in the presence of two subscribing witnesses, this 17th day of September, A. D. 1888.

FRANK N. ETHRIDGE.

Witnesses:
C. F. BROWN,
A. D. HARRISON.